(12) United States Patent
Narita et al.

(10) Patent No.: US 10,202,012 B2
(45) Date of Patent: Feb. 12, 2019

(54) SUSPENSION LINK AND PRODUCTION METHOD THEREFOR

(71) Applicant: Yorozu Corporation, Kanagawa (JP)

(72) Inventors: Akira Narita, Kanagawa (JP); Koji Matsuda, Kanagawa (JP); Tomo Tsuchida, Kanagawa (JP)

(73) Assignee: YOROZU CORPORATION, Kanagawa (JP)

( * ) Notice: Subject to any disclaimer, the term of this patent is extended or adjusted under 35 U.S.C. 154(b) by 673 days.

(21) Appl. No.: 14/778,346

(22) PCT Filed: Mar. 18, 2014

(86) PCT No.: PCT/JP2014/057410
§ 371 (c)(1),
(2) Date: Dec. 9, 2015

(87) PCT Pub. No.: WO2014/148513
PCT Pub. Date: Sep. 25, 2014

(65) Prior Publication Data
US 2016/0107494 A1  Apr. 21, 2016

(30) Foreign Application Priority Data
Mar. 19, 2013  (WO) .................. PCT/JP2013/057868

(51) Int. Cl.
B60G 7/00 (2006.01)
B21D 53/88 (2006.01)
B60G 3/06 (2006.01)

(52) U.S. Cl.
CPC ............. B60G 7/001 (2013.01); B21D 53/88 (2013.01); B60G 3/06 (2013.01);
(Continued)

(58) Field of Classification Search
CPC ............ B60G 7/001; B60G 2206/8102; B60G 2206/8103
(Continued)

(56) References Cited

U.S. PATENT DOCUMENTS 3,131,576 A    5/1964  Schilberg
8,925,945 B2 * 1/2015  Mohrlock .............. B60G 7/001
                                                        280/124.134
(Continued)

FOREIGN PATENT DOCUMENTS

DE    102011053222 A1    3/2013
JP    S61-233214 A       10/1986
(Continued)

OTHER PUBLICATIONS

International Search Report (English Translation), PCT/JP2014/057410.
(Continued)

Primary Examiner — Ruth Ilan
(74) Attorney, Agent, or Firm — Nixon Peabody LLP; Eduardo J. Quiñones; Emily N. Sandhaus

(57) ABSTRACT

[Problem] To provide a suspension link having excellent reliability in strength or the like of a coupling portion of the suspension link while being inexpensive.
[Solution] The present invention relates to a production method for a suspension link (100) having a tire coupling portion (11) that rotatably couples a tire to a suspension and a suspension coupling portion (12) that is coupled to a sub-frame member constituting the suspension, the method including: a bending process in which a plate is bent, a bent portion of the bent plate is formed into a hollow shape, and the hollow shape is used as one of the tire coupling portion and the suspension coupling portion; and an edge bending process in which an outer peripheral edge portion of the
(Continued)

plate is bent prior to the bending process. The outer peripheral edge portion of the plate is bent by the edge bending process, the outer peripheral edge portion of the plate including an area from an arm (15) to a bent portion (24).

5 Claims, 12 Drawing Sheets

(52) U.S. Cl.
CPC .... *B60G 2200/142* (2013.01); *B60G 2206/11* (2013.01); *B60G 2206/8102* (2013.01); *B60G 2206/8209* (2013.01)

(58) Field of Classification Search
USPC .................................. 280/124.134; 29/897.2
See application file for complete search history.

(56) References Cited

U.S. PATENT DOCUMENTS

| | | | | |
|---|---|---|---|---|
| 2008/0284205 | A1* | 11/2008 | Rossi | B21D 53/88 296/187.01 |
| 2009/0277010 | A1 | 11/2009 | Runte et al. | |
| 2013/0328283 | A1* | 12/2013 | Korte | B21D 53/90 280/124.134 |
| 2014/0008886 | A1 | 1/2014 | Ueno et al. | |
| 2016/0136713 | A1* | 5/2016 | Narita | B21D 28/26 428/603 |

FOREIGN PATENT DOCUMENTS

| | | |
|---|---|---|
| JP | H05-112111 A | 5/1993 |
| JP | H07-025215 A | 1/1995 |
| JP | H07-256360 A | 10/1995 |
| JP | 2003-267016 A | 9/2003 |
| JP | 2012-188076 A | 10/2012 |

OTHER PUBLICATIONS

International Preliminary Report on Patentability (English Translation), PCT/JP2014/057410.
Official Notice of Refusal of Jan. 29, 2017, JP Patent Application No. 2015-506810.
English Translation of Official Notice of Refusal of Jan. 29, 2017, JP Patent Application No. 2015-506810.
Russian Office Action for Application No. 2015143131/11 (066649); and English Translation of Russian Office Action dated Feb. 27, 2017.

\* cited by examiner

100a

10b

SUSPENSION LINK AND PRODUCTION METHOD THEREFOR

CROSS REFERENCE TO RELATED APPLICATIONS

This application is a national stage application (under 35 U.S.C. § 371) of PCT/JP2014/057410, filed Mar. 18, 2014, which claims benefit of PCT application PCT/JP2013/057868, filed Mar. 19, 2013, the contents of which are hereby incorporated by reference in their entireties.

TECHNICAL FIELD

The present invention relates to a suspension link which is a component of a suspension.

BACKGROUND ART

A suspension link, which is a component of a suspension and is configured to couple a tire and a main body of the suspension to each other, is generally provided with coupling portions which are configured to couple the suspension link and the tire to each other and the suspension link and a sub-frame of the suspension to each other. Some of the coupling portions of the tire and the sub-frame are configured in such a manner that a collar is joined to the main body portion of the suspension link made of, for example, a plate-like member by welding (see Patent Literature 1).

CITATION LIST

Patent Literature

Patent Literature 1: JP 2003-300405 A

SUMMARY OF INVENTION

Technical Problem

In the suspension link of Patent Literature 1, the main body portion of the suspension link is press-formed into a predetermined shape, a collar is welded to the main body portion of the suspension link which forms the coupling portion between the suspension link and the sub-frame, and a bushing is further press-fitted into the collar. In the suspension link in the related art, as the number of forming processes of the plate-like member or the number of components is large, costs tend to be relatively high and cost reduction is required. However, the joining between the main body portion of the suspension link and the collar is performed at a plate thickness portion of the main body portion of the suspension link in many cases. For this reason, if the plate thickness of the main body portion of the suspension link is simply made thin for the purpose of the cost reduction, the contact portion between the collar and the main body portion is reduced as the plate thickness of the main body portion becomes thinner, and thus the welding of the connection portion between the collar and the main body portion may be easily peeled away not to satisfy strength of the coupling portion.

The present invention has been made to solve the above problems, and an object thereof is to provide a suspension link having excellent reliability in strength or the like of the coupling portion of the suspension link while being inexpensive.

Means for Solving Problem

The present invention for achieving the object is a production method for a suspension link having a tire coupling portion that rotatably couples a tire to a suspension and a suspension coupling portion that is coupled to a frame-like member constituting the suspension. The production method according to the present invention includes: a bending process in which a plate is bent, a bent portion of the bent plate is formed into a hollow shape, and the hollow shape is used as one of the tire coupling portion and the suspension coupling portion; and an edge bending process in which an outer peripheral edge portion of the plate is bent prior to the bending process. In the present invention, the outer peripheral edge portion of the plate is bent by the edge bending process, the outer peripheral edge portion of the plate including an area from an arm which is configured to connect the tire coupling portion with the suspension coupling portion to the bent portion serving as the tire coupling portion or the suspension coupling portion.

In addition, the present invention is a suspension link including: a tire coupling portion that rotatably couples a tire to a suspension; and a suspension coupling portion that is coupled to a frame-like member constituting the suspension. The suspension link according to the present invention is formed from a plate, one of the tire coupling portion and the suspension coupling portion is configured by a bent portion in which the plate is bent into a hollow shape, and an outer peripheral edge portion of the plate is formed in a rising manner, the outer peripheral edge portion of the plate including an area from an arm which is configured to connect the tire coupling portion with the suspension coupling portion to the tire coupling portion or the suspension coupling portion.

Advantageous Effect of the Invention

According to a suspension link of the present invention and a production method therefor, either of a tire coupling portion or a suspension coupling portion is configured by forming a bent portion in which a plate is bent into a hollow shape. For this reason, the collar welding portions as the tire coupling portion or the suspension coupling portion are reduced or the collar welding is unnecessary, and thus it is possible to reduce the cost of the collar component or to reduce the number of welding processes. In addition, the coupling portion formed by the bending of the plate into the hollow shape differs from that of the related art in which a part of the side surface of the collar is joined to the main body portion of the suspension link, and the entire of the bent portion counteracts against an input force from the tire or the like. Therefore, it is possible to obtain a structure in which stress concentration hardly occurs and to provide the suspension link having excellent reliability in component strength or the like while being inexpensive. In addition, since the outer peripheral edge portion of the plate including the area from the arm to the bent portion is bent, it is possible to further improve the strength of the boundary between the arm and the bent portion when the tensile force is applied to the suspension link, thereby further reducing the situation in which cracks occurs in such a portion.

DESCRIPTION OF EMBODIMENTS

Figure 1:
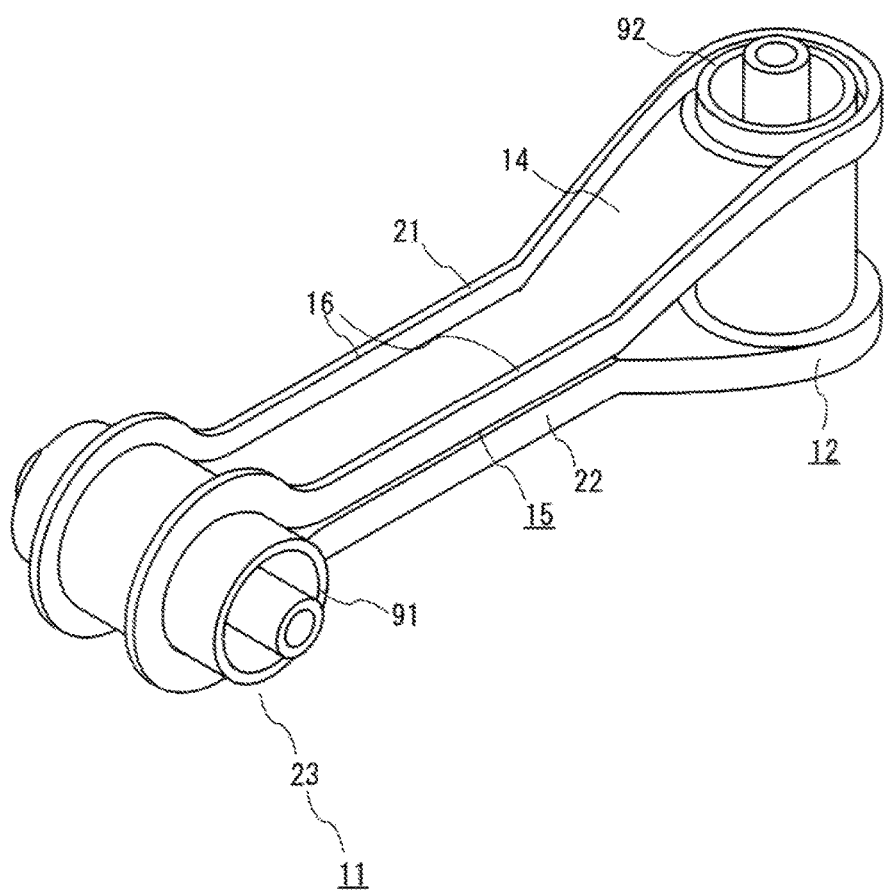
FIG. 1 is a schematic perspective view illustrating a suspension link according to an embodiment of the present invention.

An embodiment of the present invention will be described below with reference to the accompanying drawings. The following description is not intended to limit the technical scope or the meanings of terms described in the appended claims. In addition, the dimensional ratios in the drawings may be exaggerated in order to aid in description and thus may differ from the true ratios in some instances.

Figure 2A:
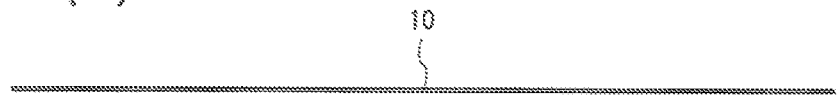
FIGS. 2(A) and 2(B) are a plan view and a front view illustrating a blank subjected to punching in a forming process of the suspension link, respectively.
Figure 2B:
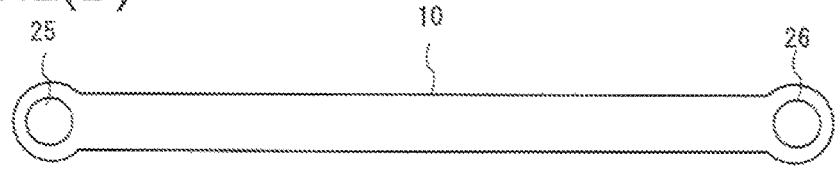
Figure 3A:
FIGS. 3(A) and 3(B) are a plan view and a front view illustrating a blank formed with a rising portion in the forming process, respectively.
Figure 3B:
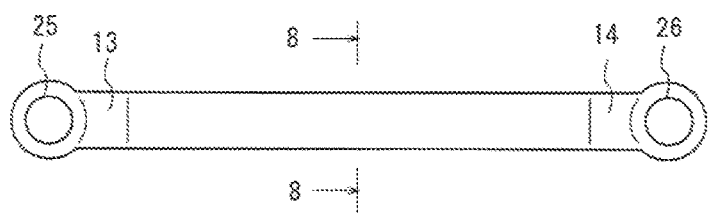
Figure 4A:
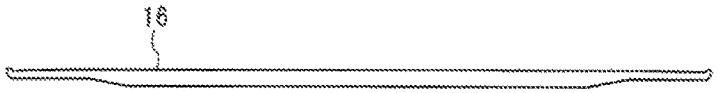
FIGS. 4(A) and 4(B) are a plan view and a front view illustrating a blank of which edge portions are risen in the forming process, respectively.
Figure 4B:
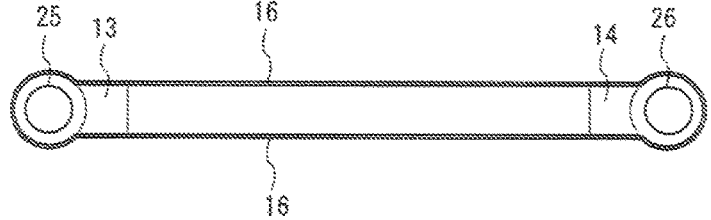
Figure 5A:
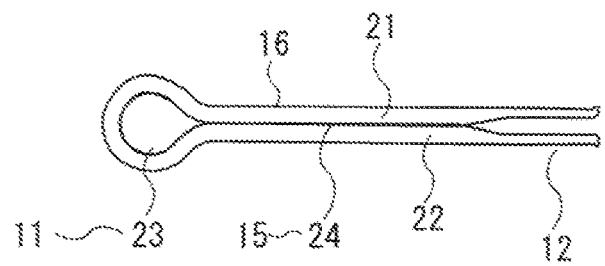
FIGS. 5(A) and 5(B) are a plan view and a front view illustrating a state where a blank is bent in the forming process, respectively.
Figure 5B:
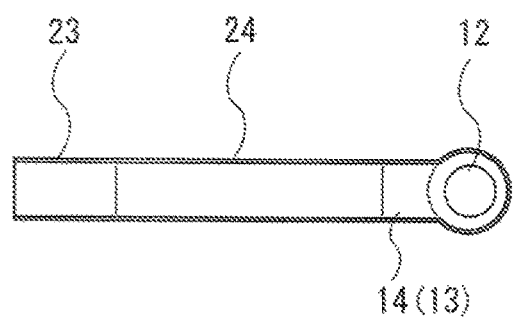
Figure 6A:
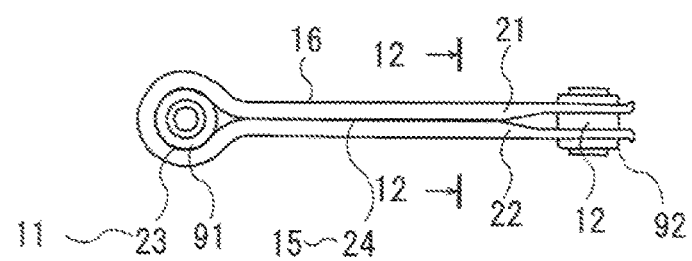
FIGS. 6(A) and 6(B) are a plan view and a front view illustrating a state where a bushing is press-fitted in the suspension link in the forming process, respectively.
Figure 6B:
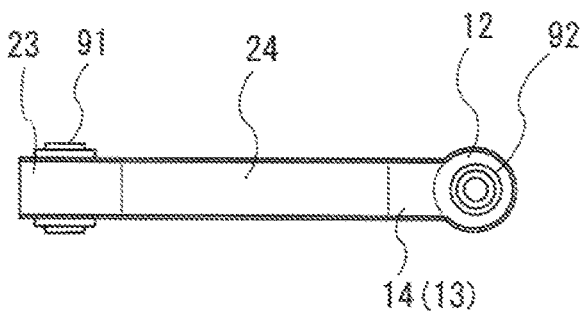

FIG. 1 is a schematic perspective view illustrating a suspension link according to an embodiment of the present invention, and FIGS. 2(A) and 2(B) are a plan view and a front view illustrating a blank subjected to punching in a forming process of the suspension link, respectively. FIGS. 3(A) and 3(B) are a plan view and a front view illustrating a blank formed with a rising portion in the forming process, respectively, and FIGS. 4(A) and 4(B) are a plan view and a front view illustrating a blank of which edge portions are risen in the forming process, respectively. In addition, FIGS. 5(A) and 5(B) are a plan view and a front view illustrating a state where a blank is bent in the forming process, respectively, and FIGS. 6(A) and 6(B) are a plan view and a front view illustrating a state where a bushing is press-fitted in the suspension link in the forming process, respectively.

When the outline description is given with reference to FIGS. 1 to 6, a piece of plate is subjected to press forming to form a suspension link 100 according to this embodiment. The suspension link 100 includes a first coupling portion 11 that is coupled to a component (knuckle or the like) connected to a tire, a second coupling portion 12 that is coupled to a frame-like member constituting a suspension, and an arm 15 that is configured to connect the first coupling portion 11 and the second coupling portion 12 to each other. Since the suspension link 100 according to this embodiment is made of a piece of plate, it has specifications that the cost of the component can be inexpensive and reliability of component strength or the like to be described below is provided. The detailed description thereof will be given below.

A bent portion 23 is formed into a cylindrical shape when the plate 10 is bent, whereby the first coupling portion 11 is formed. By the formation of the first coupling portion 11, the components connected to the tire can be coupled to the region without additional welding of a collar. The cross-sectional shape of the bent portion 23 may be a perfect circle or an ellipse other than the perfect circle, and may be a so-called D-shape formed by a combination of a straight line and a curved line.

The second coupling portion 12 is formed to be coupled to a sub-frame (also referred to as a frame, suspension member or the like in some cases and corresponding to a frame-like member) constituting the suspension, in such a manner that both ends of a long plate 10 in a longitudinal direction are punched out to form through-holes 25 and 26 and the plate 10 is bent such that through-holes 25 and 26 communicates with each other.

Although a case where components connected to the tire are attached to the first coupling portion 11 and the sub-frame of the suspension is attached to the second coupling portion 12 is described in this embodiment, the components connected to the tire and the sub-frame of the suspension may be reversely attached.

The arm 15 is a part which is configured to connect the first coupling portion 11 and the second coupling portion 12 to each other. The arm 15 is formed in a linear shape in this embodiment, but may be configured in, for example, a curved shape or a combined shape of the curved shape and the linear shape so as to avoid other components at the time of being equipped in a vehicle, without being limited thereto. In addition, the arm 15 is configured in such a manner that the through-holes 25 and 26 are connected to each other from the bent portion 23 in the plate pieces 21 and 22 formed by the bending of the plate 10. The plate pieces 21 and 22 come in contact with each other except for rising portions 13 and 14 at the area of the arm 15 and are formed with a folded portion 24, but are not limited thereto.

The rising portions 13 and 14 are formed such that the plate piece 21 and the plate piece 22 are spaced apart from each other in the second coupling portion 12 when the plate 10 is bent. Components on a vehicle body are inserted into the through-holes 25 and 26 of the plate pieces 21 and 22 and are then attached to the second coupling portion 12. In this case, since the plate pieces 21 and 22 are spaced apart from each other at the second coupling portion 12, fixing positions of the sub-frame of the suspension can be spaced apart from each other by the plate pieces 21 and 22, the sub-frame of the suspension can hardly collapse even when an external force is applied, and a posture of attached components can be stabilized to achieve excellent attaching capability. In this embodiment, a bushing 92 is attached to the coupling portion 12, but the plate pieces 21 and 22 can be configured to be spaced apart from each other even when the bushing 92 is attached, thereby achieving the same effect.

An edge portion 16 is a portion in which an edge of the plate 10 is formed to rise from an overlapped surface of the plate pieces 21 and 22 in a direction to be spaced apart from a contact position of the plate pieces 21 and 22. When the edge portion 16 is provided, it is possible to improve strength of the component against the bending or twisting of the first coupling portion 11, the second coupling portion 12, and the arm 15.

Figure 7A:
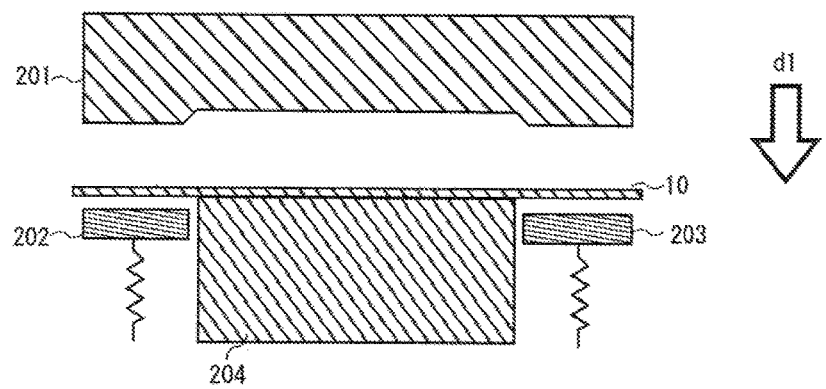
FIGS. 7(A) and 7(B) are cross-sectional views illustrating a rising-portion forming process in the forming process of the suspension link according to the embodiment.
Figure 7B:
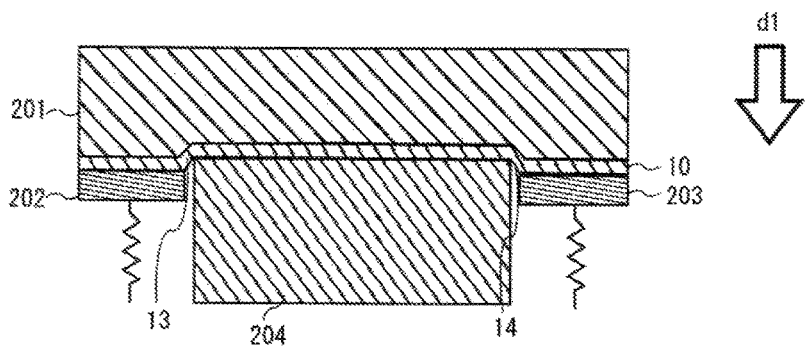
Figure 8A:
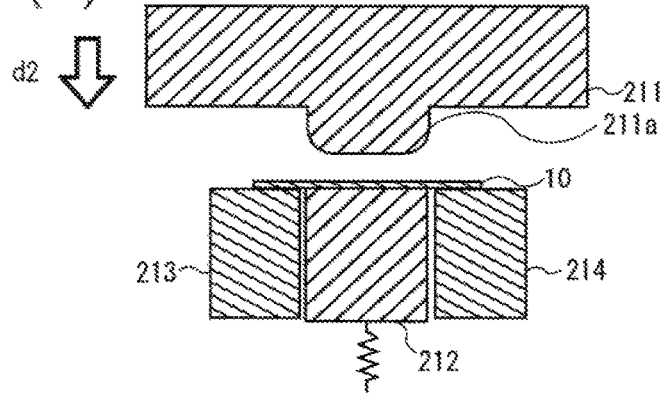
FIGS. 8(A) and 8(B) are cross-sectional views illustrating an edge bending process in the forming process of the suspension link and are cross-sectional views taken along the line 8-8 in FIG. 3.
Figure 8B:
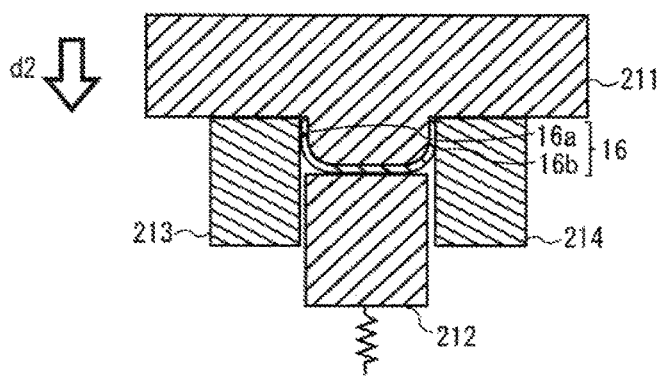

A production method for the suspension link according to this embodiment will be described below. FIGS. 7(A) and 7(B) are cross-sectional views illustrating a forming process of the rising portion in a forming process of the suspension link according to this embodiment, and FIGS. 8(A) and 8(B) are cross-sectional views illustrating an edge bending process in the forming process of the same suspension link. In addition, FIGS. 9(A) and 9(B) and FIGS. 10(A) and 10(B) are cross-sectional views illustrating a bending process in the forming process of the same suspension link.

Briefly, the production method for the suspension link 100 according to this embodiment includes a coupling-portion forming process (corresponding to a punching process), a rising-portion forming process, an edge bending process, and a plate bending process, but the production method for the suspension link 100 is not limited to the following method. Each of the processes will be described below in detail.

First, a plate such as a rolled steel sheet is formed into an outer shape as illustrated in FIGS. 2(A) and 2(B) by punching in a state of being flattened prior to the processes described above. Since the second coupling portion 12 is configured in such a manner that the attached component is inserted into the plane of the plate 10, this portion is formed into the outer shape of the component, for example, a circular shape, by the punching.

In the coupling-portion forming process, both ends of the plate 10 in a longitudinal direction are subjected to circular punching. In this way, the through-holes 25 and 26 are formed on the plate 10 as illustrated in FIGS. 2(A) and 2(B), and are formed as the second coupling portion 12 later. Since an apparatus performing the punching is known in the related art, the apparatus will not be presented in the drawings.

In the rising-portion forming process, the plates of the plate pieces 21 and 22 in the second coupling portion 12 rise toward the center from both ends of the plate 10 to be spaced apart from each other without being overlapped with each other when the plate pieces 21 and 22 are bent. In the rising-portion forming process, as illustrated in FIG. 7(A), the plate 10 is placed on a stationary die 204, and a movable die 201 having a predetermined recess-projection shape is lowered toward the stationary die 204 from an opposite side of the stationary die 204, thereby performing the press forming (see an arrow d1 in FIGS. 7(A) and 7(B)). In addition to the stationary die 204, holders 202 and 203 are opposed to the movable die 201 across the blank 10 to prevent excessive deformation of the blank 10 due to an elastic force of a spring or the like. In this way, when die clamping is performed by the stationary die 204, the movable die 201, and the holders 202 and 203, the rising portions 13 and 14 are formed on the plate 10.

In the edge bending process, as illustrated in FIG. 8(A), the plate 10 is placed on stationary dies 213 and 214 and a holder 212, and a movable die 211 having a holder projection shape 211a is lowered from the top in FIG. 8(A) to pressurize the plate 10 (see an arrow d2 in FIGS. 8(A) and 8(B)). In this way, as illustrated in FIG. 8(B), edge portions 16a and 16b are formed at both right and left sides of the plate 10 in accordance with downward stroke movement of the holder 212 due to the projection shape 211a of the movable die 211. The edge portion 16 is provided on the entire outer periphery of the plate 10 as illustrated in FIG. 1 in this embodiment, but the edge portion 16 may be partially formed on the periphery without being formed on the entire periphery.

Figure 9A:
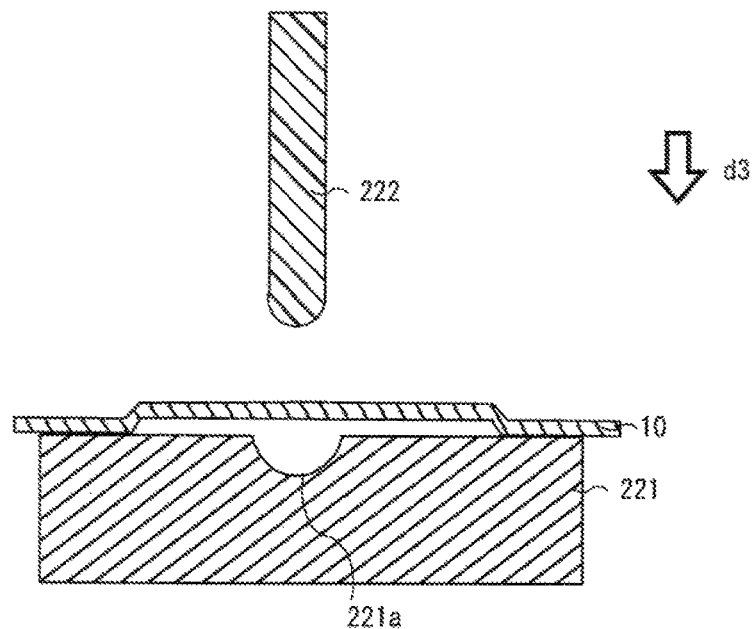
FIGS. 9(A) and 9(B) are cross-sectional views illustrating a bending process in the forming process of the suspension link.
Figure 9B:
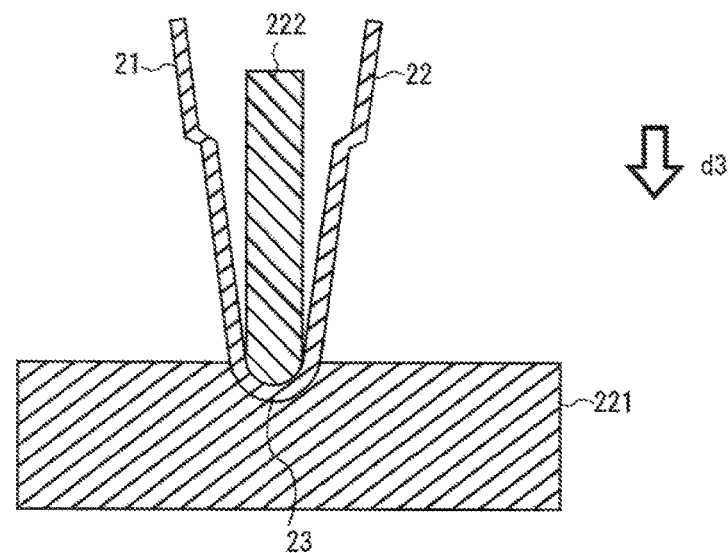

In the bending process, as illustrated in FIG. 9(A), first, the plate 10 formed with the rising portions 13 and 14 is placed on a stationary die 221 having a recess portion 221a. Then, a movable die 222 having a semi-cylinder tip is brought close to the recess portion 221a of the stationary die 221 such that the area of the bent portion 23 is formed inside the recess portion 221a, thereby performing the press forming (see an arrow d3 in FIGS. 9(A) and 9(B)). In this way, as illustrated in FIG. 9(B), the plate 10 is bent from the bent portion 23 as a starting point, and the plate pieces 21 and 22 rise to come close to the sides of the movable die 222.

Figure 10A:
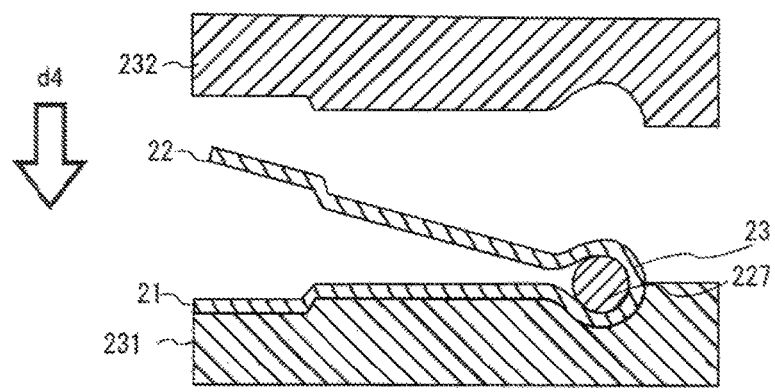
FIGS. 10(A) and 10(B) are cross-sectional views illustrating a bending process in the forming process of the suspension link.
Figure 10B:
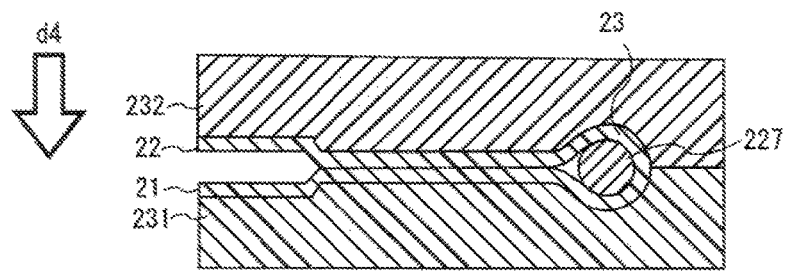

Subsequently, as illustrated in FIG. 10(A), the plate 10 is placed on a stationary die 231 in a state where a core 227 is disposed inside the bent portion 23 of the plate 10 to fix the plate 10. Then, a movable die 232 is brought close toward the stationary die 231, thereby performing the press forming on the plate 10 (see an arrow d4 in FIGS. 10(A) and 10(B)). In this way, the plate piece 21 comes in contact with the plate piece 22 at the area of the arm 15, the shape of the bent portion 23 is completed, and thus the suspension link 100 is completed.

In this embodiment, the plate pieces 21 and 22 come in contact with each other at the arm 15 when the bent portion 23 is completed. However, the plate pieces 21 and 22 may be joined by welding or the like.

In addition, as illustrated in FIGS. 6(A) and 6(B), bushings 91 and 92 may be inserted into the first coupling portion 11 and the second coupling portion 12, respectively, if necessary.

Next, operation and effect of the suspension link according to this embodiment will be described. In the related art, for example, a collar is joined to the side portion having only the plate thickness of the main body portion of the suspension link made of the plate by the welding. For this reason, there are concerns that: the joining portion between the collar and the main body portion of the suspension link has only the plate thickness; a welding position may not be sufficiently secured; and the welded portion is peeled away when the external force is applied.

In contrast, the suspension link 100 according to this embodiment has the first coupling portion 11 which is configured in a hollow circular shape to be formed when the plate 10 is bent in the bending process. Therefore, the first coupling portion 11 is not separated from the components connected to the first coupling portion 11 as long as the plate is not pulled up to the extent of being broken. Accordingly, compared to the related art in which the collar is welded onto the main body portion of the suspension link made of the plate, tensile strength of the coupling portion can become strong. In addition, as the collar is not welded, collar costs or welding costs can be reduced. For this reason, it is possible to provide the suspension link having excellent reliability in strength of the coupling portion while being inexpensive. In addition, since the outer peripheral edge portion of the plate including the area from the arm to the bent portion is bent, it is possible to further improve the strength of the boundary between the arm and the bent portion when the tensile force is applied to the suspension link, thereby further reducing the situation in which cracks occurs in such a portion.

Furthermore, the outer peripheral edge portion of the suspension link 100 rises in the edge bending process prior to the bending process and thus is formed as the edge portion 16. For this reason, the first coupling portion 11, the second coupling portion 12, or the arm 15 robustly counteract even when the bending or torsional force is applied, and thus the strength of the suspension link can be improved.

In addition, the second coupling portion 12 is configured by the through-holes 25 and 26 formed in such a manner that both ends of the long plate 10 in the longitudinal direction are punched out in the punching process prior to the bending process. For this reason, even in the coupling portion other than the first coupling portion 11, it is possible to eliminate the component costs of the collar or the welding costs compared to the case of welding the collar as in the related art and to reduce the costs of the suspension link.

Moreover, the plate pieces 21 and 22 in the second attaching portion 12 are formed to be spaced apart from each other without contacting or abutting with each other while facing each other. For this reason, the frame-like member can hardly collapse even when the frame-like member is attached to the second coupling portion 12 and the external force is applied thereto, and the posture of the components attached to the second coupling portion 12 can be stabilized to achieve the excellent attaching capability of the components to be attached.

The present invention is not limited to the above embodiment, but can be variously changed within the scope of the appended claims.

Figure 11A:
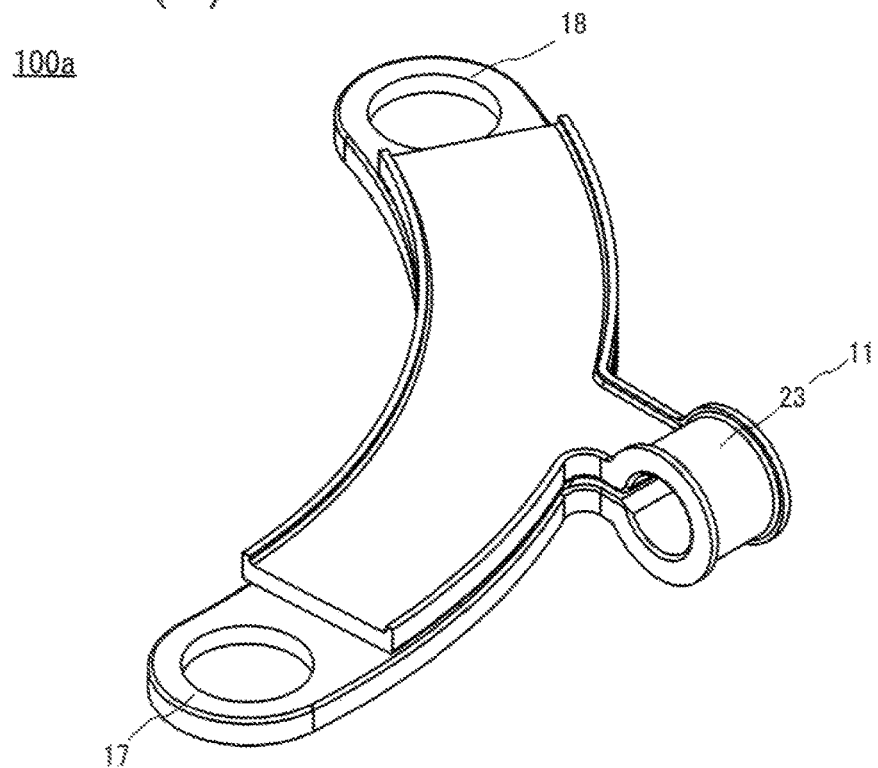
FIG. 11(A) is a perspective view illustrating a suspension link according to a modification example of the present invention.
Figure 11B:
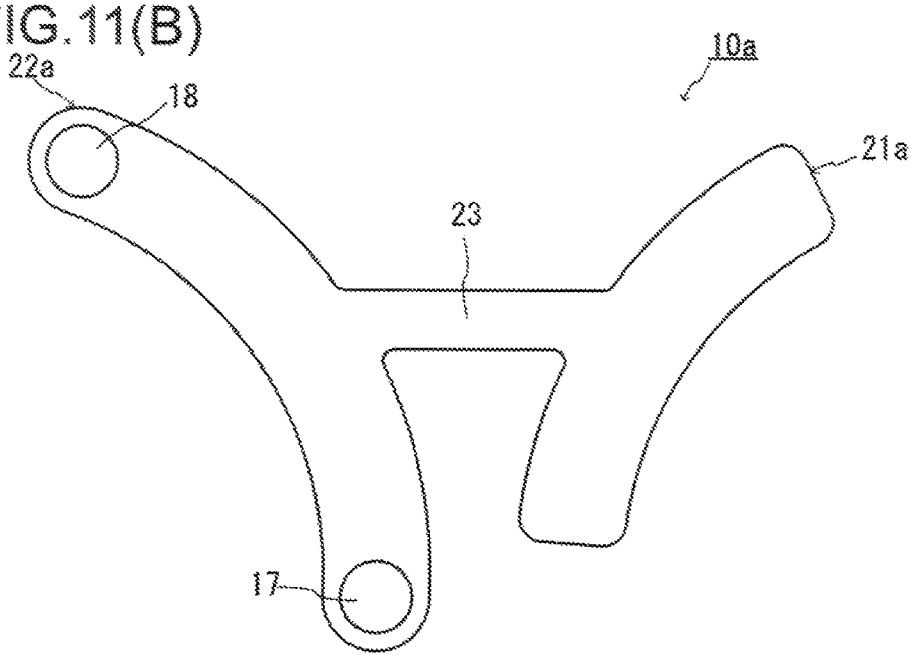
FIG. 11(B) is a plan view illustrating a plate before the suspension link is bent.

FIG. 11(A) is a perspective view illustrating a suspension link according to a modification example of the present invention, and FIG. 11(B) is a plan view illustrating a state before a plate constituting the suspension link is bent. The description is given with respect to the embodiment in which the suspension link 100 includes the first coupling portion 11 formed by the bending of the plate into the hollow shape and the second coupling portion 12 configured by the through-holes 25 and 26, but is not limited thereto.

As illustrated in FIGS. 11(A) and 11(B), a bent portion 23 of a plate 10a is bent to divide the plate 10a into a plate piece 22b and a plate piece 21a, and the suspension link may have three coupling portions of a first coupling portion 11 of a hollow shape, a second coupling portion 17 configured by a through-hole, and a third coupling portion 18 configured by a through-hole.

In addition, the description is given with respect to the embodiment in which the second coupling portion 12 is configured in such a manner both ends of the plate 10 is punched to attach the sub-frame of the suspension and the plate piece 21 and the plate piece 22 are spaced apart from each other from a contacting or abutting position, but is not limited thereto. The second coupling portion may be configured such that the portions of the plate pieces 21 and 22 corresponding to the second coupling portion are formed into a semi-circular cylindrical shape, both of the portions are butted to be in a state of being formed into a cylindrical shape, and the butted position is fixed by, for example, welding or calking in this state. In addition, the description is given with respect to the embodiment in which the plate pieces 21 and 22 at the arm 15 are abutted onto each other or come close to each other, but the plate pieces 21 and 22 may be spaced apart from each other without being limited thereto.

Furthermore, the description is given with respect to the embodiment in which the second coupling portion 12 is configured in such a manner that both ends of the plate 10 are punched out to form the through-holes 25 and 26 and the through-holes 25 and 26 are bent to be inserted, but is not limited thereto. As illustrated in FIGS. 11(A) and 11(B), a through-hole is formed at only one side of the plate 10 in the longitudinal direction, and a coupling portion may be configured by bending of the plate 10 such that the through-hole is not blocked when the plate 10 is bent.

Figure 12A:
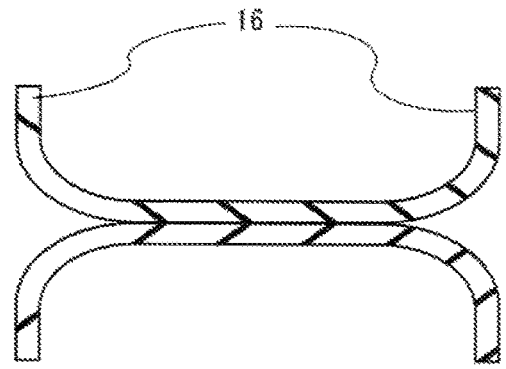
FIG. 12(A) is a cross-sectional view taken along the line 12-12 in FIG. 6, and FIGS. 12(B) and 12(C) are cross-sectional views illustrating modification examples of FIG. 12(A).
Figure 12B:
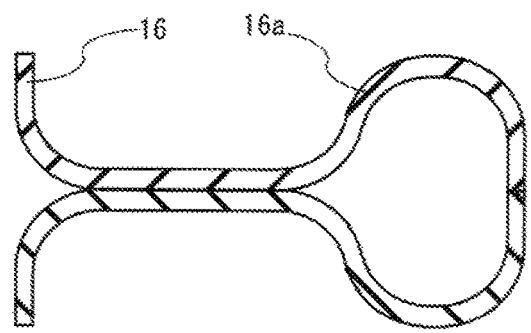
Figure 12C:
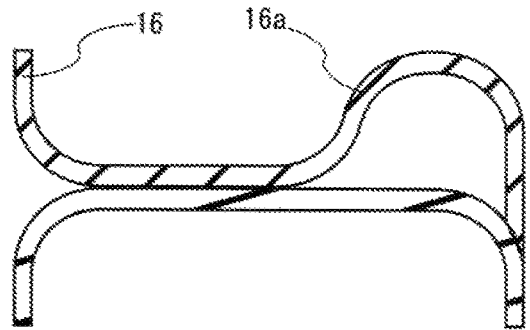
Figure 13:
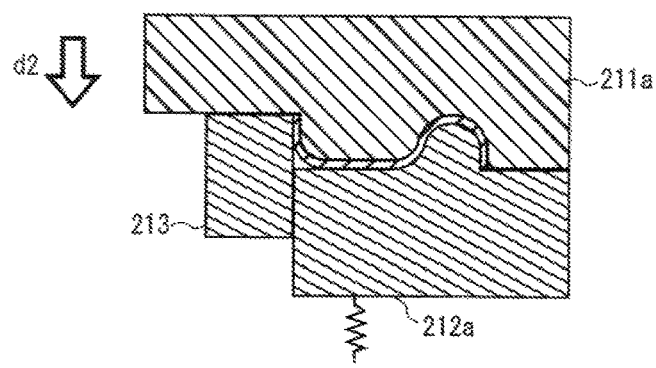
FIG. 13 is a cross-sectional view illustrating a modification example of FIG. 8(B).

FIG. 12(A) is a cross-sectional view taken along the line 12-12 in FIG. 6, FIGS. 12(B) and 12(C) are cross-sectional views illustrating modification examples of FIG. 12(A), and FIG. 13 is a cross-sectional view illustrating a modification example of FIG. 8(B).

In the above description, as illustrated in FIG. 12(A), the description is given with respect to the embodiment in which the edge portion of the plate extending in the longitudinal direction rises in the edge bending process to form the edge portion 16 and thus the strength of the suspension link is improved, but is not limited thereto. The strength of the suspension link can be improved using not only the edge portion 16 formed by the rising of the edge portion of the plate but also a hollow reinforcing portion 16a (corresponding to another hollow shape) in such a manner that the plate pieces are butted to each other in a state of forming a space therein as illustrated in FIGS. 12(B) and 12(C). In the edge bending process of the above embodiment, the hollow reinforcing portion 16a can be formed using, for example, dies 211a and 212a as illustrated in FIG. 13 instead of the dies 211, 212, and 214 illustrated in FIG. 8(B), but is not limited thereto.

The hollow reinforcing portion 16a may be formed on the suspension link 100 illustrated in FIG. 1 and may be formed on a suspension link 100a illustrated in FIG. 11. In addition, the hollow reinforcing portion 16a may be formed on both of the plate pieces illustrated in FIG. 12(B) and may be formed on only one of the plate pieces.

Figure 14:
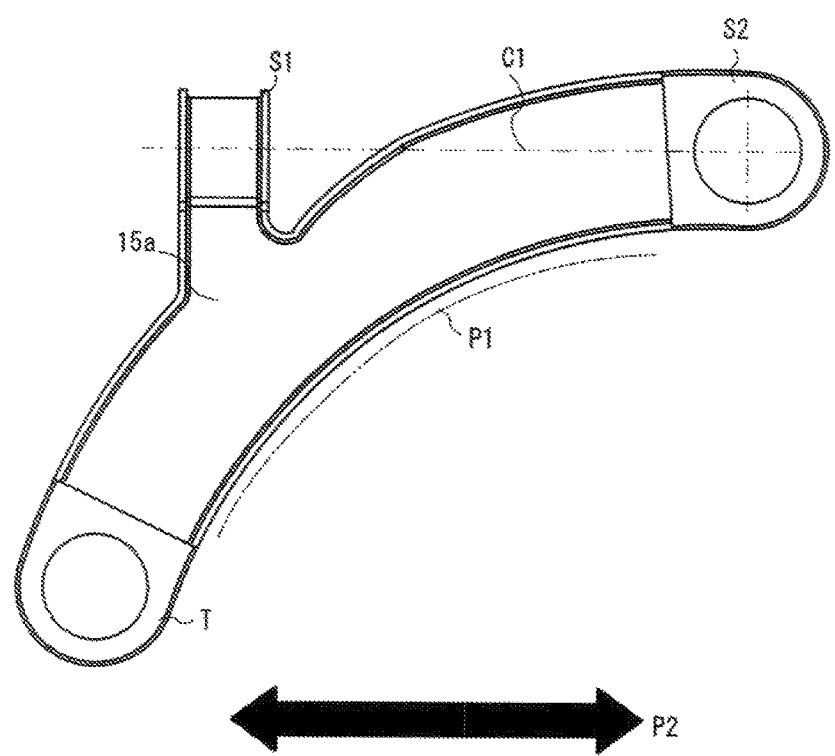
FIG. 14 is a plan view illustrating the suspension link in FIGS. 11(A) and 11(B).

FIG. 14 is a plan view illustrating the suspension link illustrated in FIGS. 11(A) and 11(B). As illustrated in FIG. 14, the suspension link 100a includes a tire coupling portion T, suspension coupling portions S1 and S2, and an arm 15a. An input force in a front-back direction of the vehicle (see an arrow P2 in FIG. 14) is particularly strict in the suspension link, and the suspension link may be designed to satisfy the strength against the input force.

In this case, the arm 15a configured to connect the tire coupling portion T with the suspension coupling portions S1 and S2 is reinforced not only by the edge portion 16 but also the hollow reinforcing portion 16a, and thus it is possible to perform the reinforcement while suppressing an increase in weight and component costs. When the shape of the suspension link is as illustrated in FIG. 14, an area of two-dot chain line P1 likely tends to bend by the input force in the front-back direction P2, and thus the hollow reinforcing portion 16a is preferably formed on the area of two-dot chain line P1 of the arm 15a. Moreover, in the case of the suspension link 100 illustrated in FIG. 1, the hollow reinforcing portion 16a is formed on at least one side of the arm 15 configured to connect the first coupling portion 11 with the second coupling portion 12. In FIG. 14, a vertical direction is a right-left direction of the vehicle, an upper side corresponds to an inner side, and a lower side corresponds to an outer side.

In addition, the suspension coupling portions S1 and S2 are preferably disposed along the front-back direction of the vehicle to counteract against the input force in the front-back direction as illustrated in FIG. 14. A case where the suspension coupling portions S1 and S2 are disposed along the front-back direction of the vehicle indicates a case where the outer shape of one suspension coupling portion is included in the outer shape of the other suspension coupling portion when the outer shape of one of the suspension coupling portions S1 and S2 is projected to the other suspension coupling portion along the front-back direction of the vehicle. A virtual line C1 in FIG. 14 is a line extending along the front-back direction of the vehicle from the center of the suspension coupling portion S2, and the virtual line C1 passes through a central axis of the suspension coupling portion S1. In this way, the suspension coupling portions S1 and S2 are disposed along the front-back direction of the vehicle, and thus it is possible to directly counteract against the input force in the front-back direction of the vehicle without angular displacement and to satisfy requirement specifications such as strength with a simple shape. Instead of the suspension coupling portion, a plurality of tire coupling portions may be disposed along the front-back direction of the vehicle.

Figure 15A:
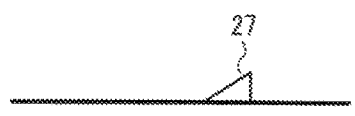
FIGS. 15(A) to 15(D) are a side view, a front view, a perspective view, and a plan view illustrating plate working in a punching process, respectively.
Figure 15B:
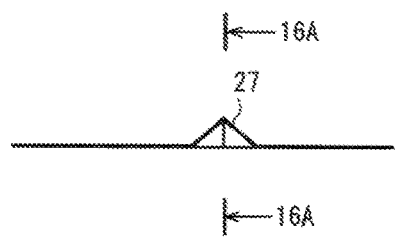
Figure 15C:
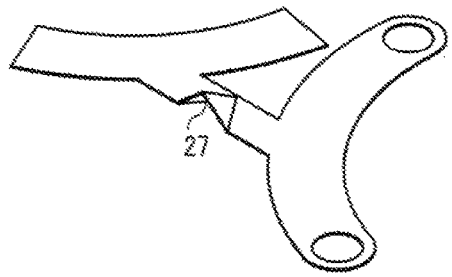
Figure 15D:
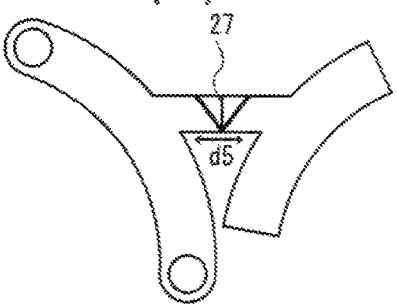
Figure 15E:
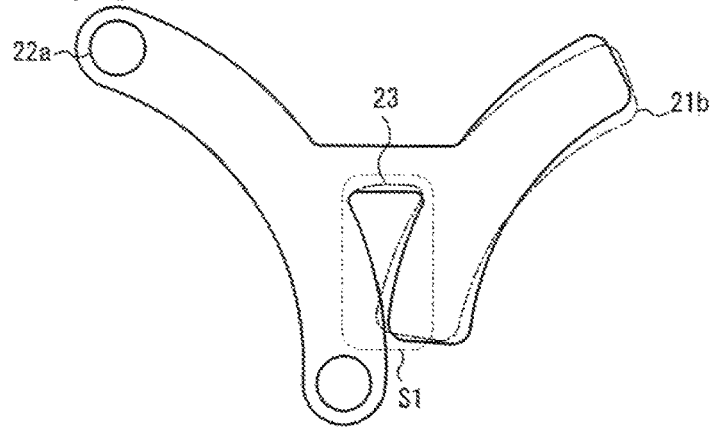
FIG. 15(E) is an explanatory diagram illustrating an adjacent portion between plate pieces after the punching.
Figure 16:
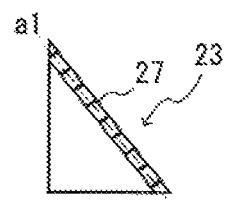
FIG. 16 is a cross-sectional view taken along the line 16A-16A in FIG. 15(B).

FIGS. 15(A) to 15(D) are a side view, a front view, a perspective view, and a plan view illustrating plate working in the punching process, respectively, and FIG. 15(E) is an explanatory diagram illustrating an adjacent portion between the plate pieces after the punching. FIG. 16 is a cross-sectional view taken along the line 16A-16A in FIG. 15(B).

The description is given with respect to a case where the plate is punched into a predetermined shape in the coupling-portion forming process in the state of being flattened prior to the punching, but is not limited thereto. When the suspension link 100a made up of three clamping points as illustrated in FIG. 11 is considered, the lower sides of the plate pieces 21a and 22a in FIG. 15(E) divided by the bent portion 23 are close to each other as in a portion S1. For this reason, since the adjacent portion S1 in FIG. 15(E) becomes close when the plate 10a is bent in a flat state, the completed suspension link may not be formed such that the outer shape of one of the coupling portions is included in the outer shape of the other coupling portion when being projected to the other coupling portion along the front-back direction of the vehicle (see a plate piece 21b in FIG. 15(E)).

In this regard, during the coupling-portion forming process (punching process), first, the outer shape other than the portion S1 of the plate 10b illustrated in FIG. 15(E) is punched. Then, as illustrated in FIGS. 15(A) to 15(D), at least a part of the bent portion 23 of the plate 10b is stretched to form a bulge portion 27 protruding from the flat plate 10b (referred to as a bulge-portion forming process).

Then, the portion S1 is subjected to the punching in the state illustrated in FIG. 15(D). When the punching is completed, the rising-portion forming process and the edge bending process are performed. Then, as illustrated in FIG. 16, the bending is performed as an axis a1 at the time of bending the bulge portion 27 in the bending process, and the bent portion 23 including the bulge portion 27 is integrated with the bulge portion 27 (see two-dot chain line in FIG. 16) to form a hollow shape as illustrated in FIG. 11. The bent portion 23 linearly extends between the plate piece 21b and the plate piece 22a (see an arrow d5 in FIG. 15(D)), and the axis a1 is inclined from the plane portion of the bent portion 23 (see FIG. 16) and is configured to intersect with the extending direction d5 of the bent portion 23.

When the forming is performed as described above, even in a product shape in which the plate pieces come close to each other, either of the tire coupling portion or the suspension coupling portion can be configured by the bending of the plate as in this embodiment, and an applicable scope of this embodiment can be expanded. The bulge-portion forming process may be performed in a state where the edge portion of the plate rises or does not rise.

In addition, even in the suspension link formed by the bulge-portion forming process, it is possible to attach components such as the bushing by forming the bent portion into a uniform shape.

The punching process of punching the outer shape of the plate may be performed at the time of the punching (coupling-portion forming process) of the through-holes 25 and 26 described in the above embodiment or may be separately performed.

This application is based on International Application No. PCT/JP2013/057868 based on the Patent Cooperation Treaty, filed on Mar. 19, 2013, the entire contents of which are incorporated herein by reference.

REFERENCE SIGNS LIST

10: Plate
100, 100a: Suspension link
11: First coupling portion (tire coupling portion)
12, 17: Second coupling portion (suspension coupling portion)
13, 14: Rising portion
15: Arm (link portion)
16: Edge portion
16a: Hollow reinforcing portion (other hollow shape)
18: Third coupling portion
21, 21a, 22, 22a: Plate piece
23: Bent portion
24: Folded portion
25, 26: Through-hole (first through-hole and second through-hole)
27: Bulge portion
91, 92: Bushing
204, 213, 214, 221, 231: Stationary die
201, 211, 214, 222, 232: Movable die
202, 203, 212: Holder
211a: Projection shape
221a: Recess portion
227: Core
a1: Axis
d1 to d4: Moving direction of movable die
d5: Extending direction of bent portion
S1: Adjacent portion between plate pieces

The invention claimed is:

1. A production method for a suspension link having a tire coupling portion that rotatably couples a tire to a suspension and a suspension coupling portion that is coupled to a frame-like member constituting the suspension, the method comprising:
a bending process in which a plate is bent, a bent portion of the bent plate is formed into a hollow shape, and the hollow shape is used as one of the tire coupling portion and the suspension coupling portion; and
a bulge-portion forming process in which at least a part of the bent portion of the plate having a flat shape is stretched to form a bulge portion protruding from the bent portion of the plate having the flat shape, prior to the bending process.

2. The production method for a suspension link according to claim 1, further comprising a punching process in which at least one end of the plate in a longitudinal direction is punched out to form a through-hole prior to the bending process, wherein the other of the tire coupling portion and the suspension coupling portion is configured by the through-hole formed by the punching process.

3. The production method for a suspension link according to claim 1, further comprising an edge bending process in which an outer peripheral edge portion of the plate is bent prior to the bending process, wherein the outer peripheral edge portion of an arm between the tire coupling portion and the suspension coupling portion is bent by the edge bending process.

4. The production method for a suspension according to claim 1, wherein after the bulge-portion forming process, the bent portion including the bulge portion is bent to form the hollow shape in the bending process.

5. The production method for a suspension link according to claim 1, wherein at least two of the tire coupling portion or the suspension coupling portion are configured, and the at least two of the tire coupling portion or the suspension coupling portion are disposed along a front-back direction of a vehicle.

\* \* \* \* \*